(12) United States Patent
Rilett et al.

(10) Patent No.: US 11,817,704 B2
(45) Date of Patent: Nov. 14, 2023

(54) TRANSPARENT CUSTOMIZABLE AND TRANSFERRABLE INTELLIGENT TRADING AGENT

(71) Applicant: Distro Energy B.V., Rotterdam (NL)

(72) Inventors: James Rilett, London (GB); Isabel Tang, London (GB); Raza Hassan, London (GB); Simon Thorne, London (GB)

(73) Assignee: Distro Energy B.V., Rotterdam (NL)

( * ) Notice: Subject to any disclaimer, the term of this patent is extended or adjusted under 35 U.S.C. 154(b) by 221 days.

(21) Appl. No.: 17/182,614

(22) Filed: Feb. 23, 2021

(65) Prior Publication Data

US 2022/0271533 A1 Aug. 25, 2022

(51) Int. Cl.
*H02J 3/00* (2006.01)
*G06N 3/04* (2023.01)
(Continued)

(52) U.S. Cl.
CPC .......... *H02J 3/008* (2013.01); *G06F 18/2178* (2023.01); *G06N 3/04* (2013.01); *G06Q 30/0206* (2013.01); *H02J 3/003* (2020.01)

(58) Field of Classification Search
CPC ........ H02J 3/008; H02J 3/003; G06K 9/6263; G06N 3/04; G06Q 30/0206; G06Q 50/06; Y04S 10/50; Y04S 50/10; Y04S 50/14
See application file for complete search history.

(56) References Cited

U.S. PATENT DOCUMENTS 9,866,024 B2 * 1/2018 Ukita ................. H02J 3/32
2018/0128863 A1 * 5/2018 Utsumi ................ G06Q 50/06
(Continued)

FOREIGN PATENT DOCUMENTS

| WO | WO-2020000399 A1 * | 1/2020 | |
|----|---|---|---|
| WO | 2020092446 A2 | 5/2020 | |
| WO | WO-2020092446 A2 * | 5/2020 | ............. G06Q 10/04 |

OTHER PUBLICATIONS

Rubio et al., "TugaTAC Broker: A Fuzzy Logic Adaptive Reasoning Agent for Energy Trading," Multi-Agent Systems and Agreement Technologies, 13th European Conference, EUMAS 2015, and Third International Conference, Athens, Greece, Dec. 17-18, 15 pages.

(Continued)

*Primary Examiner* — Mohammad Ali
*Assistant Examiner* — Dhruvkumar Patel
(74) *Attorney, Agent, or Firm* — Yee & Associates, P.C.

(57) ABSTRACT

A method of trading electrical energy is provided. The method comprises a smart agent receiving state data affecting electricity usage within an electrical power grid over a specified time period and forecasting, with a supply/demand model, supply and demand for electricity within the power grid according to the state data. The smart agent uses a reinforced learning neural network to calculate a price for electricity according the state data and forecasted supply and demand. The smart agent submits an order to a matching engine to buy or sell electricity on the power grid at the calculated price according to specified market rules. The smart engine receives an acknowledgment from the matching engine if the order is matched to another agent on the power grid or a rejection from the matching engine if the order is not matched to another agent.

18 Claims, 6 Drawing Sheets

(51) Int. Cl.
*G06Q 30/0201* (2023.01)
*G06F 18/21* (2023.01)

(56) References Cited

U.S. PATENT DOCUMENTS

| | | | |
|---|---|---|---|
| 2018/0240201 A1* | 8/2018 | Eda | H02J 13/00002 |
| 2019/0372345 A1* | 12/2019 | Bain | G06Q 30/0601 |
| 2021/0021128 A1* | 1/2021 | Subramanian | G06Q 50/06 |

OTHER PUBLICATIONS

Misra et al., "Agent-based energy trading with incomplete information in the smart grid," Journal of Network and Computer Applications, Issue 55, June 201 11 pages.
European Patent Office Extended Search Report, dated Jul. 25, 2022, regarding Application No. EP22158211.7, 13 pages.

* cited by examiner

TRANSPARENT CUSTOMIZABLE AND TRANSFERRABLE INTELLIGENT TRADING AGENT

BACKGROUND INFORMATION

1. Field

The present disclosure relates generally to an improved computing system, and more specifically to distributed trading agents buying and selling electricity on a smart energy grid.

2. Background

A smart grid integrates communication networks with underlying electrical networks. Users/customers of the smart grid, while buying electricity from the grid when needed, increasingly generate their own electricity and sell it back to the grid when possible. Smart meters are implemented at the customers' end to communicate with the smart grid on price, and demand and supply information. Distributed trading agents can be implemented to trade energy on behalf of customers. The trading agents rely on several optimization algorithm to maximize efficiency.

With the advancement of small-scale energy producing technology and battery technology, energy consumers face many more options of how to use, store, or trade energy on a smart grid. Energy can be traded for different time slots and intervals, ranging from several minutes to months and can be traded through direct purchase transactions, auctions, or tariff contracts. Adding to the complication, multiple smart appliances may consume energy differently depending on the availability and price of energy at different times.

Therefore, it would be desirable to have a method and apparatus that take into account at least some of the issues discussed above, as well as other possible issues.

SUMMARY

An illustrative embodiment provides a computer-implemented method of trading electrical energy. The method comprises a smart agent receiving state data affecting electricity usage within an electrical power grid over a specified time period and forecasting, with a supply/demand model, supply and demand for electricity within the power grid over the specified time period according to the state data. The smart agent uses a reinforced learning neural network to calculate a price for electricity for the specified time period according the state data and forecasted supply and demand. The smart agent submits an order to a matching engine to buy or sell electricity on the power grid at the calculated price according to specified market rules. The smart engines receives an acknowledgment from the matching engine if the order is matched to another agent on the power grid or a rejection from the matching engine if the order is not matched to another agent on the power grid.

Another embodiment provides a computer-implemented method for managing orders in the marketplace for trading electrical energy. The method comprises a matching engine receiving order requests for electricity from a number of subscribed smart agents and updating a marketplace orderbook with the order requests submitted by the subscribed smart agents. The matching engine notifies the subscribed smart agents to update respective local orderbooks to synchronize with the marketplace orderbook. The matching engine determines if there are matching buy and sell orders available in the marketplace orderbook and transmit to the subscribed smart agents an acknowledgement for each order request that is matched with an available order in the marketplace orderbook.

Another embodiment provides a system for trading electrical energy. The system comprises a storage device configured to store program instructions and one or more processors operably connected to the storage device and configured to execute the program instructions to cause the system to: receive, by a matching engine, order requests for electricity from a number of subscribed smart agents; update, by the matching engine, a marketplace orderbook with the order requests submitted by the subscribed smart agents; notify, by the matching engine, the subscribed smart agents to update respective local orderbooks to synchronize with the marketplace orderbook; determine, by the matching engine, if there are matching buy and sell orders available in the marketplace orderbook; and transmit, by the matching engine, to the subscribed smart agents an acknowledgement for each order request that is matched with an available order in the marketplace orderbook.

Another embodiment provides a system for managing orders in the marketplace for trading electrical energy. The system comprises a storage device configured to store program instructions and one or more processors operably connected to the storage device and configured to execute the program instructions to cause the system to: receive, by a matching engine, order requests for electricity from a number of subscribed smart agents; update, by the matching engine, a marketplace orderbook with the order requests submitted by the subscribed smart agents; notify, by the matching engine, the subscribed smart agents to update respective local orderbooks to synchronize with the marketplace orderbook; determine, by the matching engine, if there are matching buy and sell orders available in the marketplace orderbook; and transmit, by the matching engine, to the subscribed smart agents an acknowledgement for each order request that is matched with an available order in the marketplace orderbook.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that customers of the smart grid, in addition to buying electricity, also might generate their own electricity and sell it back to the grid when possible. Smart meters might be implemented at the customers' end to communicate with the smart grid on price, and demand and supply information.

The illustrative embodiments also recognize and take into account that Distributed trading agents are implemented to trade energy on behalf of customers. Trading agents rely on several optimization algorithm to maximize efficiency. However, under the current technology, customers have limited control over the behavior of trading agents trading on their behalf.

The illustrative embodiments also recognize and take into account that smart appliances may consume energy differently depending on the availability and price of energy at different times. Batteries can also store different amounts of energy based on weather prediction, the availability, and price of energy at different times. In addition, owners may set any kind of parameters to meet their own objectives, including utilizing batteries to reduce cost or achieving local optimization goals.

The illustrative embodiments provide a smart agent system that facilitates peer-to-peer trading between smart agents representing buyers and sellers of electrical power within a smart power grid. The illustrative embodiments also provide a centralized information clearinghouse for the smart agents and trading model profiles for weather, usage, and pricing data.

The illustrative embodiments provide customizable trading agent profiles to allow customers to adjust trading agent behavior according to different conditions and preferences. To maximize efficiency, the customization is performed automatically through machine learning. Conditions and preferences are transparent such that they may be set by customers and machine learning can generate corresponding optimal trading agent profiles with algorithms. Over time, performance of the modified trading agent profiles can be evaluated and rated based on data analysis and/or machine learning modeling. Such profiles can also be sold or transferred on an energy trading platform under the same or similar market rules so that other customers can take advantage of efficient energy trading agent profiles without having to invest their efforts to find optimal profiles.

Figure 1:
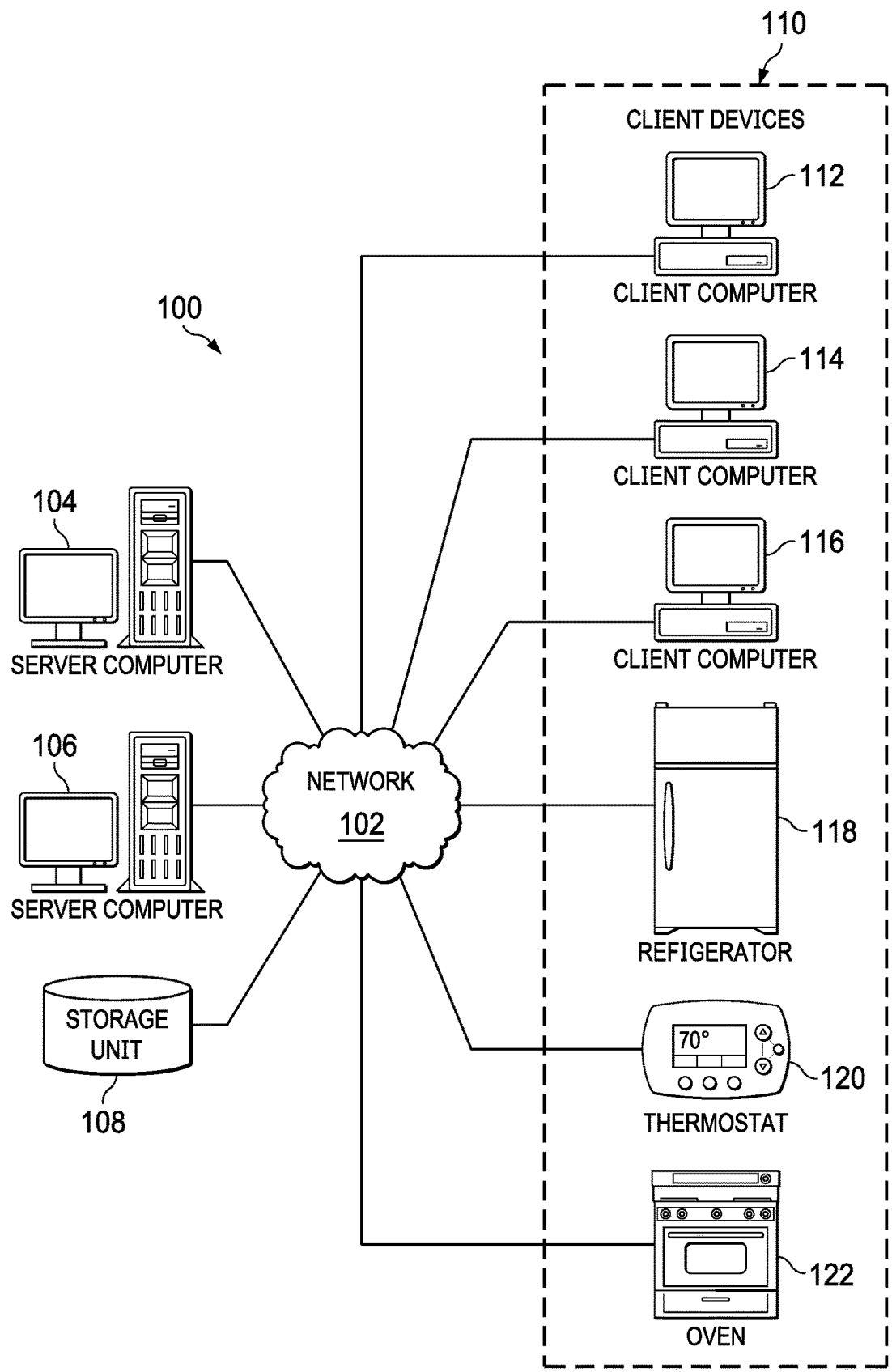
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as refrigerator 118, thermostat 120, and oven 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
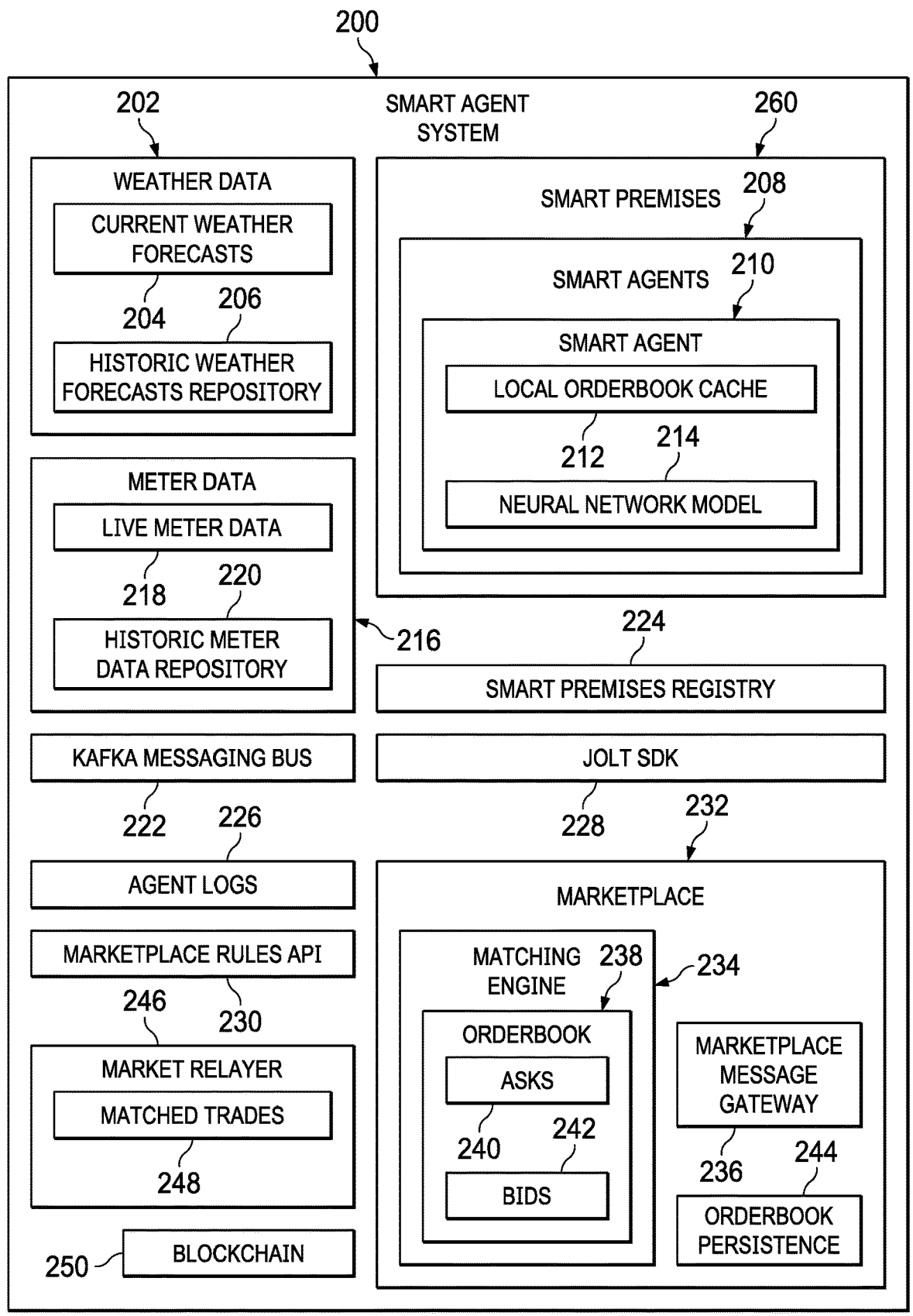
FIG. 2 is a block diagram of a smart agent system depicted in accordance with an illustrative embodiment.

FIG. 2 is a block diagram of a smart agent system depicted in accordance with an illustrative embodiment. Smart agent system 200 might be implemented in network data processing system 100 in FIG. 1.

Smart agent system 200 comprises weather data 202, meter data 216, smart premises 260, smart agents 208, market relayer 246, blockchain 250, and marketplace 232.

Weather data 202 comprises a number of current weather forecasts 204 and a historic weather forecasts repository 206. Weather forecasts 204 might be provided by a weatherman service and comprise forecasts for registered smart premises 260 over a specified time window, e.g., the next 48 hours at a pre-determined frequency, e.g., five-minute intervals. Smart premises registry 224 might provide registered premises' 260 geographic location information to accurate weather forecast intervals. Weather forecasts 204 can be persisted in historic weather forecasts repository 206 for future reference.

Meter data 216 might comprise live meter data 218 and a historical meter data repository 220. Live meter data 218 for registered smart premises 260 might be retrieved in a look-back time window, e.g., last 48 hours at a pre-determined frequency, e.g., five-minute intervals. Smart premises registry 224 might provide registered premises' 260 meter device information for specific live meter readings harnessing.

Most recent live meter data 218 can be persisted in historical meter data repository 220 as time passes and becomes historic. An historic meter data bootstrapper might take one-off snapshots of the registered smart premises 260 up to a present moment and store them in historic meter data repository 220 for smart premises 260 to assemble artificial intelligence (AI) model input data.

Registered smart premises comprise smart agents 208. Each smart agent 210 might comprise a local orderbook cache 212, and a neural network model 214. Smart agent 210 uses neural network model 214 to place bids and offers and can sign orders.

The marketplace 232 might comprise a matching engine 234 and marketplace message gateway 236. Matching engine 234 includes orderbook 238, which comprises ask orders 240 and bid orders 242. Marketplace 232 might also comprise a persistent version 244 of the orderbook 238.

Agent logs 226 store all bids and offers from smart agents 208 and are used for final validation of marketplace matched trades. Market relayer 246 comprises matched trades 248. Blockchain 250 ensures the security and integrity of transactions in marketplace 232.

Market relayer 246 subscribes to matched trades published by marketplace 232 and provides final validation of signed orders. Market relayer 246 provides a service of validating signed orders before passing them to the blockchain 250 for settlement. The architecture of the illustrative embodiments provides off-chain relay and on-chain settlement. Orders are cryptographically signed by the token owner to ensure security but not broadcast to the blockchain 250 until all changes are final.

This takes bloat off the chain by only broadcasting the final outcome of the transaction to the blockchain.

Marketplace rule application programming interface (API) 230 receives the latest blockchain rules (e.g., wallet, pMin, pMax), which are sent to smart agents 208 and marketplace 232. Jolt software development kit (SDK) 228 enforces market rules received from the blockchain.

Kafka messaging bus 222 can be used to transfer information between smart agents 208, market relayer 246, and the marketplace 232 as well as convey weather data 202 and meter data 216.

Smart agent system 200 can be implemented in software, hardware, firmware, or a combination thereof. When software is used, the operations performed by smart agent system 200 can be implemented in program code configured to run on hardware, such as a processor unit. When firmware is used, the operations performed by smart agent system 200 can be implemented in program code and data and stored in persistent memory to run on a processor unit. When hardware is employed, the hardware may include circuits that operate to perform the operations in smart agent system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

There are three main categories of machine learning: supervised, unsupervised, and reinforced learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforced learning (RL) methods learn from feedback to re-learn/retrain the models. Algorithms are used to train the predictive model through interacting with the environment using measurable performance criteria.

Figure 3:
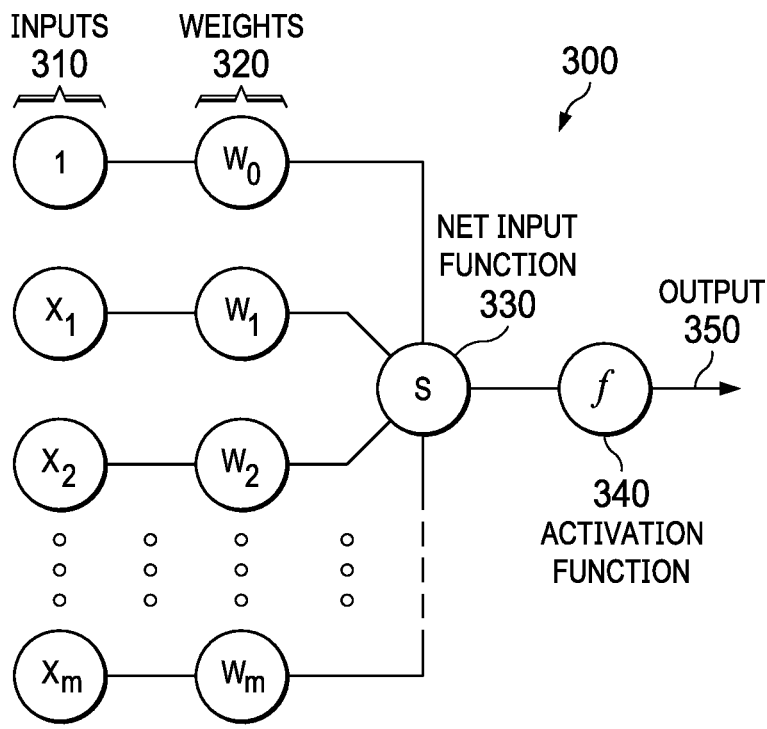
FIG. 3 is a diagram that illustrates a node in a neural network in which illustrative embodiments can be implemented.

FIG. 3 is a diagram that illustrates a node in a neural network in which illustrative embodiments can be implemented. Node 300 combines multiple inputs 310 from external sources or from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
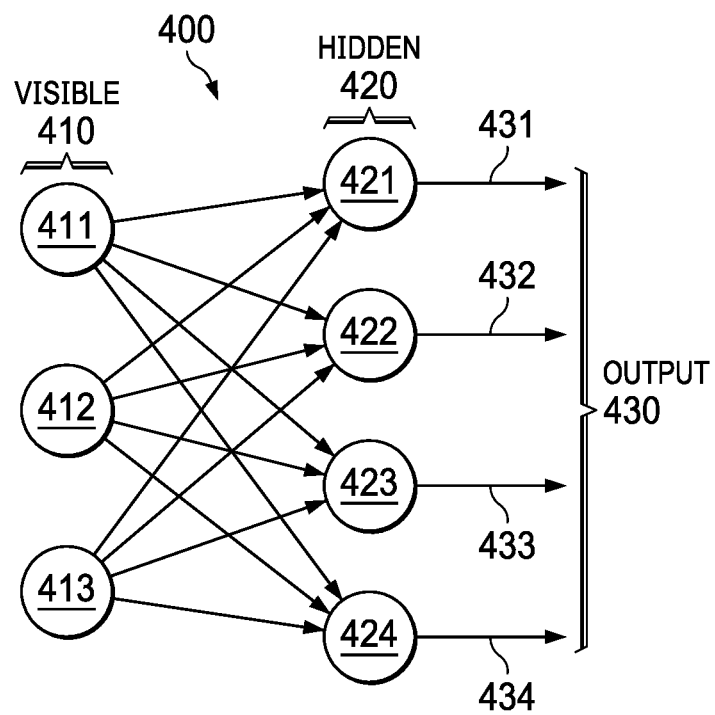
FIG. 4 is a diagram illustrating a neural network in which illustrative embodiments can be implemented.

FIG. 4 is a diagram illustrating a neural network in which illustrative embodiments can be implemented. As shown in FIG. 4, the nodes in the neural network 400 are divided into a layer of visible nodes 410 and a hidden layer 420. The visible nodes 410 are those that receive information from the environment (i.e., a set of external training data). Each layer in visible nodes 410 takes a low-level feature from an item in the dataset and passes it to the hidden nodes in the hidden layer 420. When a node in the hidden layer 420 receives an input value x from a layer in visible nodes 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 receives input from all of the visible nodes 411-413 each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the outputs 430 of hidden layer 420 serve as inputs to the next hidden layer.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

In machine learning, error is calculated via a cost function that estimates how the model is performing. It is a measure of how wrong the model is in terms of its ability to estimate the relationship between input x and output y, which is expressed as a difference or distance between the predicted value and the actual value. The cost function (i.e., loss or error) can be estimated by iteratively running the model to compare estimated predictions against known values of y during supervised learning. The objective of a machine learning model, therefore, is to find parameters, weights, or a structure that minimizes the cost function.

Figure 5:
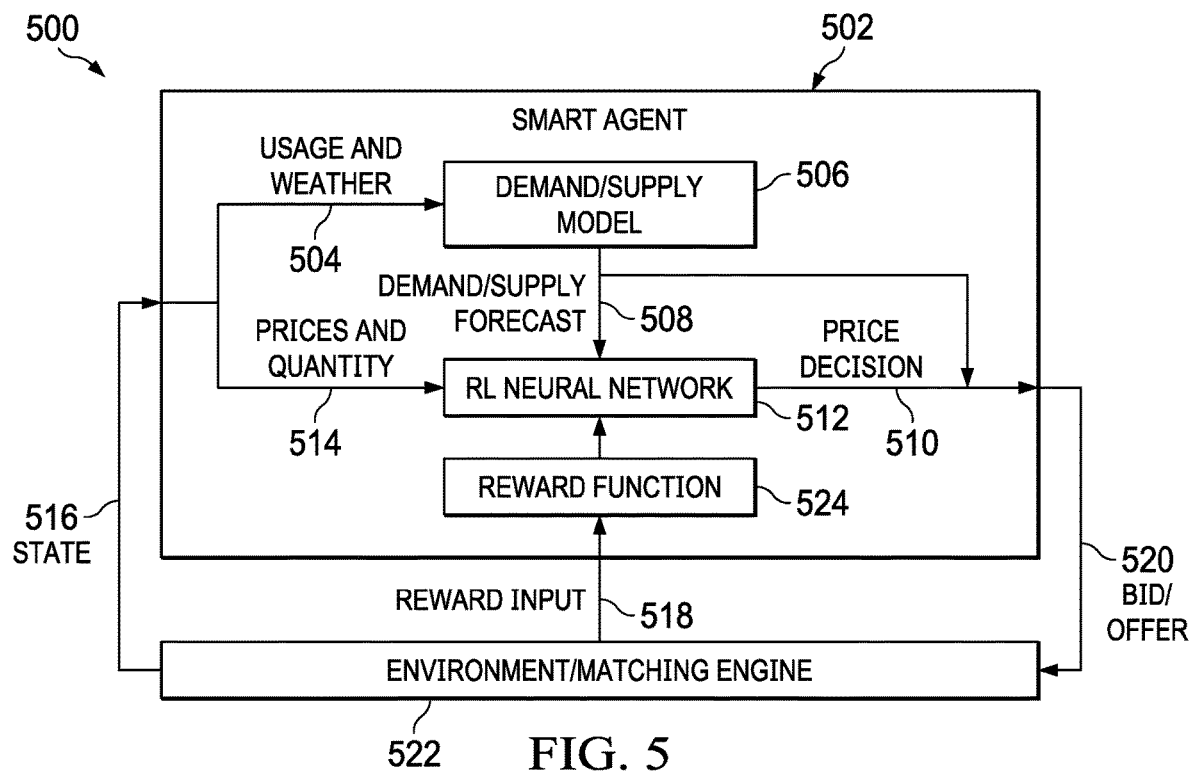
FIG. 5 depicts a diagram illustrating a process of reinforced learning for a smart agent in accordance with an illustrative embodiment.

FIG. 5 depicts a diagram illustrating a process of reinforced learning for a smart agent in accordance with an illustrative embodiment. Smart agent 502 might be an example of smart agent 210 in FIG. 2. Environment/matching engine 522 might comprise weather data 202, meter data 216, and matching engine 234 in FIG. 2.

Environment/matching engine 522 provides current state data 516 as input to smart agent 502. State data 516 might comprise market conditions (e.g., prices and quantity), electrical usage data, and weather data.

Usage and weather data 504 from state data 516 are fed as input to the demand/supply model 506 in smart agent 502. Demand/supply model 506 uses the usage and weather data 504 to generate a demand/supply forecast 508, which is provided as an input to the RL neural network 512. Additionally, RL neural network 512 receives existing pricing and quantity data 514 from state data 516. RL neural network 512 uses the price and quantity data 514 and demand/supply forecast 508 to generate price decision 510.

The smart agent 502 uses the price decision 510 to place a bid/offer 520 to the environment/matching engine 522 for creating, modifying, or canceling an order to buy/sell the quantity of power supplied/demanded for a certain price. Environment/matching engine 522 generates a reward input 518, which is provided to reward function 524 in smart agent 502. Reward input 518 is based on the success or failure of price decision 510 to find a matching bid/ask from another agent in the marketplace and is used for reinforcement learning of RL neural network 512. The reward function 524 calculates the reward based on the outcome of the smart agent's action associated with the matching engine output.

Reward input 518 is based on a reward function that might comprise an inverse of a transaction price multiplied by a quantity of power transacted raised to the power of a variable factor. Ways to calculate rewards can vary. In one example, a quantity procured at a lower price will result in a higher reward than the same quantity procured at a higher price.

Updated state data 516 of the orders and system environment is provided to smart agent 502 to prepare for the next processing cycle.

Figure 6:
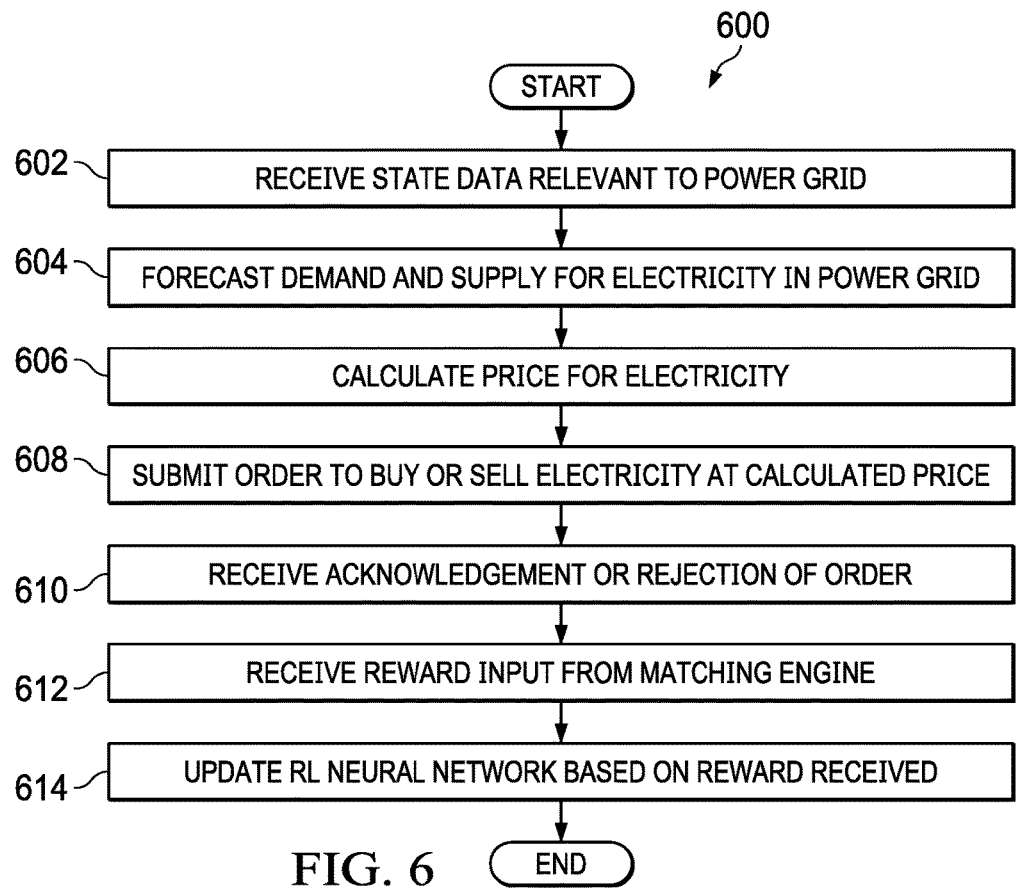
FIG. 6 depicts a flowchart illustrating a process for trading electrical energy with a smart agent in accordance with an illustrative embodiment.

FIG. 6 depicts a flowchart illustrating a process for trading electrical energy with a smart agent in accordance with an illustrative embodiment. Process 600 can be implemented in hardware, software, or both. When implemented in software, the process can take the form of program code that is run by one of more processor units located in one or more hardware devices in one or more computer systems. Process 600 might be implemented in smart agent system 200 in FIG. 2 and utilize smart agent 502 in FIG. 5.

Process 600 begins with a smart agent receiving state data affecting electricity usage within an electrical power grid over a specified time period (step 602). The state data might comprise usage data from meters on the power grid and weather forecast information.

A supply/demand model in the smart agent forecasts supply and demand for electricity within the power grid over a specified time period according to the state data (step 604). The supply/demand forecasting model might be constructed from open source modeling packages such as, e.g., SciPy, NumPy, and other Python tools.

A reinforced learning neural network in the smart agent calculates a price for electricity for the specified time period according to the state data and forecasted supply and demand (step 606). The reinforced learning neural network models a customer profile of electricity use.

The smart agent submits an order to a matching engine to buy or sell electricity on the power grid at the calculated price according to specified market rules (step 608). The new order might be placed concurrently with a cancellation or modification of a preexisting order. The market rules can be provided by a blockchain.

The smart agent receives an acknowledgment from a matching engine on the grid if the order is accepted by the matching engine or a rejection if the order is not accepted by the matching engine (step 610). The matching engine accepts the order if it can successfully match the order to a corresponding order from another smart agent on the grid (i.e., match a seller and buyer). The matching engine rejects the order if it cannot match the order with a corresponding order from another smart agent. Once matched, the order can no longer be modified or cancelled. The smart agent can sign an order to validate acknowledgment of an accepted order.

The smart agent receives an input from the matching engine for calculating a reward according to whether the order is accepted or rejected (step 612). The reward function involves a function that takes into account the total quantity procured at a price. Acknowledgment and rejection will affect the total quantity and price.

The reinforced learning neural network is then updated according to the calculated reward received from the matching engine (step 614). Process 600 then ends.

Figure 7:
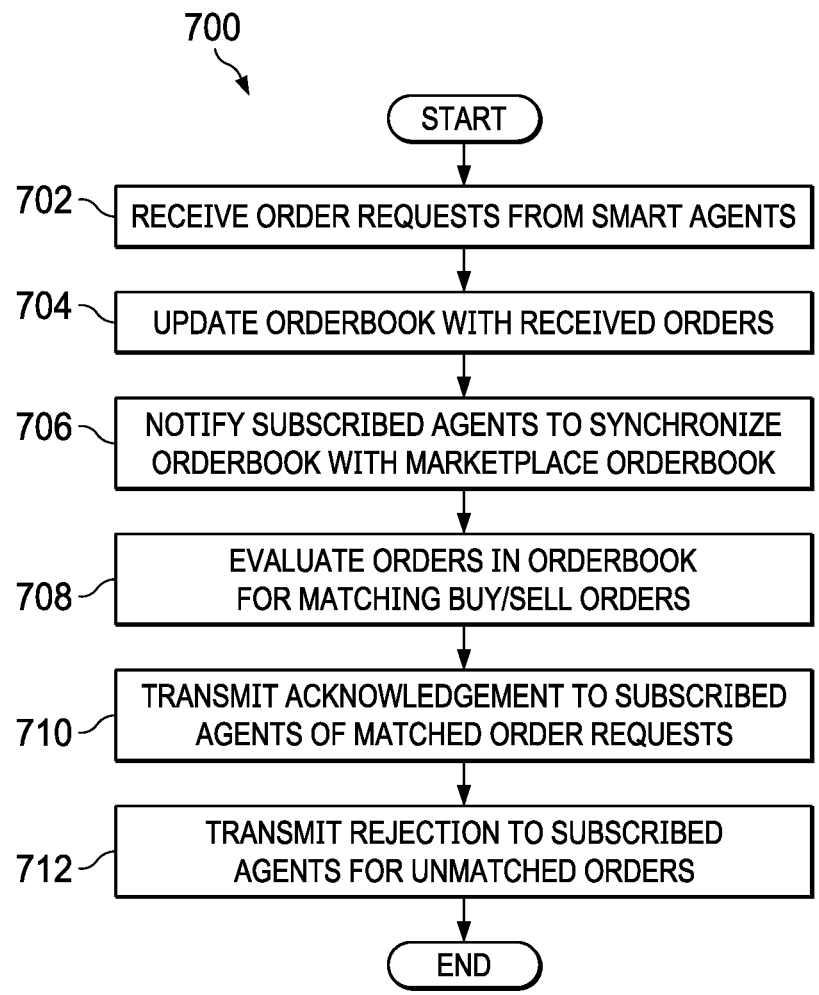
FIG. 7 depicts a flowchart for a process managing orders in the marketplace for trading electrical energy in accordance with an illustrative embodiment.

FIG. 7 depicts a flowchart for a process managing orders in the marketplace for trading electrical energy in accordance with an illustrative embodiment. Process in 700 can be implemented in hardware, software, or both. When implemented in software, the process can take the form of program code that is run by one or more processor units located in one or more hardware devices in one or more computer systems. Process 700 might be implemented with matching engine 234 in FIG. 2.

Process 700 begins by a matching engine receiving order requests from a number of subscribed smart agents (step 702). The received order requests might comprise new orders or modify orders or cancel orders. A cancel order requests the matching engine to remove an order from the marketplace orderbook.

The matching engine updates a marketplace orderbook with the order requests submitted by the subscribed smart agents (step 704). The marketplace orderbook separates the new orders into buy orders and sell orders. The matching engine notifies the subscribed smart agents to update respective local orderbooks in the smart agents to synchronize with the marketplace orderbook (step 706).

The matching engine determines if there are matching buy and sell orders available in the marketplace orderbook (step 708).

The matching engine transmits an acknowledgement to the subscribed smart agents for each order request that is matched with an available order in the marketplace orderbook (step 710). The matching engine can use a message gateway to communicate with the subscribed smart agents. A requested quantity of power in a buy order can be partially fulfilled by available sell orders in the marketplace orderbook. A remaining quantity of electricity requested in the buy order is stored in the marketplace orderbook as a new child buy order with a purchase quantity equal to the remaining quantity of electricity to be purchased.

The matching engine transmits a rejection to the subscribed smart agents for each order that is not matched with an available order in the marketplace orderbook (step 712). Process 700 then ends.

Figure 8:
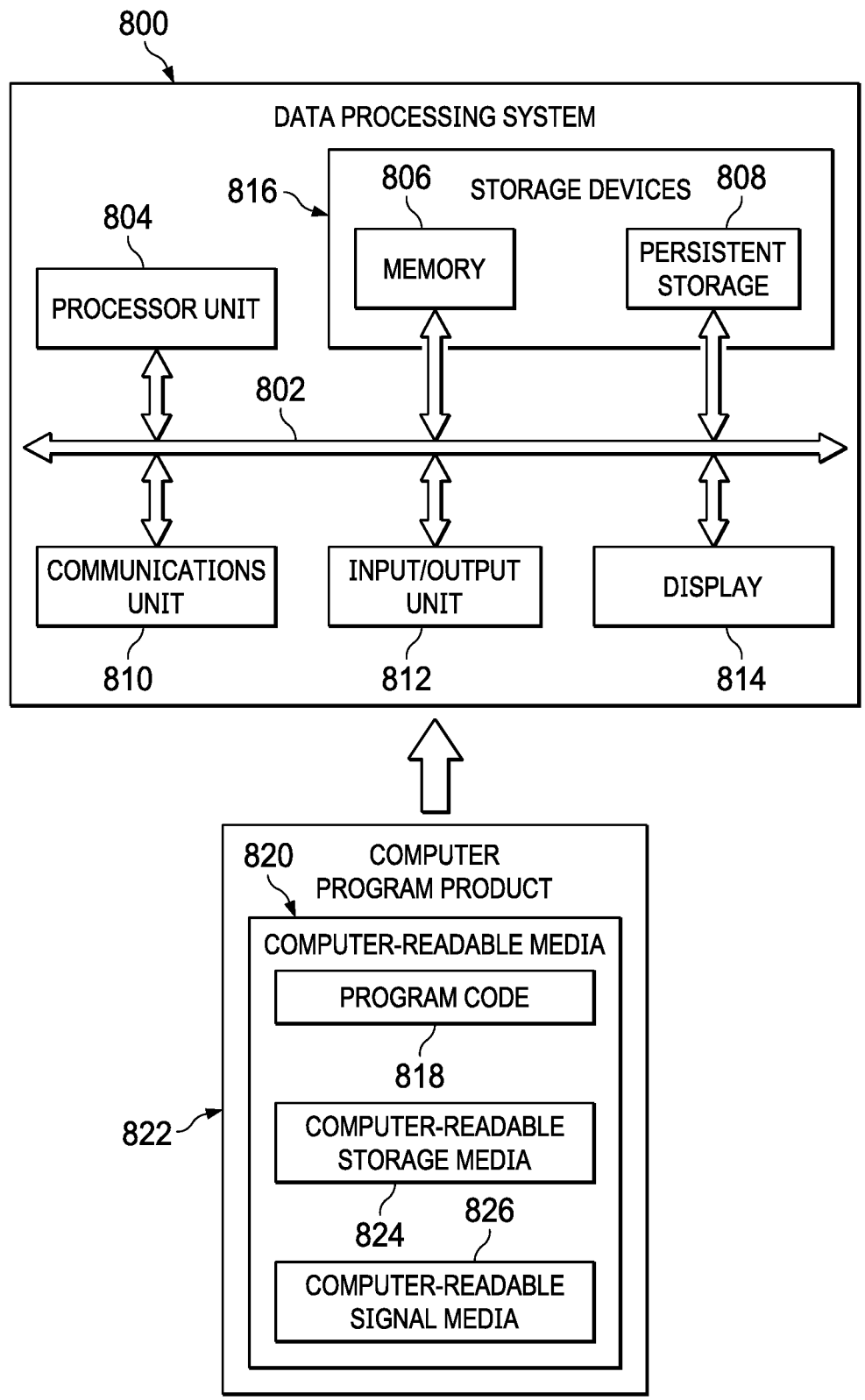
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. Further, data processing system 800 can also be used to implement one more components in smart agent system 200 in FIG. 2. In this illustrative example, data processing system 800 includes communications framework 802, which provides communications between processor unit 804, memory 806, persistent storage 808, communications unit 810, input/output (I/O) unit 812 and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

Persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in a separate data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 806, or portions thereof, may be incorporated in processor unit 804 in some illustrative examples.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of trading electrical energy, the method comprising:
   using a number of processors to perform the steps of:
   receiving, by a smart agent, state data affecting electricity usage within an electrical power grid over a specified time period;
   forecasting, by a supply/demand model in the smart agent, supply and demand for electricity within the electrical power grid over the specified time period according to the state data;
   calculating, by a reinforced learning neural network in the smart agent, a price for electricity for the specified time period according the state data and forecasted supply and demand, wherein the smart agent includes a reward function that comprises an inverse of a transaction price multiplied by a quantity of power transacted raised to the power of a variable factor, wherein a quantity procured at a lower price will result in a higher reward than the same quantity procured at a higher price;

submitting, by the smart agent, an order to a matching engine to buy or sell electricity on the power grid at a calculated price according to specified market rules; and receiving, by the smart agent:
an acknowledgment from the matching engine if the order is matched to another agent on the power grid; or
a rejection from the matching engine if the order is not matched to another agent on the power grid.

2. The method of claim 1, further comprising:
receiving, by the smart agent, a reward input from the matching engine according to whether the order is acknowledged or rejected;
calculating a reward from reward input according to the reward function in the smart agent; and
updating the reinforced learning neural network according to the calculated reward.

3. The method of claim 1, wherein the state data comprises usage data from meters on the power grid.

4. The method of claim 1, wherein the state data comprises weather forecast information.

5. The method of claim 1, wherein submitting the order comprises at least one of:
cancelling a preexisting order;
modifying a preexisting order; or
placing a new order.

6. The method of claim 1, further comprising signing, by the smart agent, an order to validate acknowledgment of a matched order.

7. The method of claim 1, wherein the market rules are provided by a blockchain.

8. The method of claim 1, wherein the reinforced learning neural network models a customer profile of electricity use.

9. The method of claim 1, wherein the supply/demand forecasting model is constructed from open source modeling packages.

10. A system for trading electrical energy, the system comprising:
a storage device configured to store program instructions; and
one or more processors operably connected to the storage device and configured to execute the program instructions to cause the system to:
receive, by a smart agent, state data affecting electricity usage within an electrical power grid over a specified time period;
forecast, by a supply/demand model in the smart agent, supply and demand for electricity within the power grid over the specified time period according to the state data;
calculate, by a reinforced learning neural network in the smart agent, a price for electricity for the specified time period according the state data and forecasted supply and demand, wherein the smart agent includes a reward function that comprises an inverse of a transaction price multiplied by a quantity of power transacted raised to the power of a variable factor, wherein a quantity procured at a lower price will result in a higher reward than the same quantity procured at a higher price;
submit, by the smart agent, an order to a matching engine to buy or sell electricity on the power grid at a calculated price according to specified market rules; and
receive, by the smart agent:
an acknowledgment from the matching engine if the order is matched to another agent on the power grid; or
a rejection from the matching engine if the order is not matched to another agent on the power grid.

11. The system of claim 10, further comprising:
receive, by the smart agent, a reward input from the matching engine according to whether the order is acknowledged or rejected;
calculate a reward from reward input according to the reward function in the smart agent; and
update the reinforced learning neural network according to the calculated reward.

12. The system of claim 10, wherein the state data comprises usage data from meters on the power grid.

13. The system of claim 10, wherein the state data comprises weather forecast information.

14. The system of claim 10, wherein submitting the order comprises at least one of:
cancelling a preexisting order;
modifying a preexisting order; or
placing a new order.

15. The system of claim 10, further comprising signing, by the smart agent, an order to validate acknowledgment of a matched order.

16. The system of claim 10, wherein the market rules are provided by a blockchain.

17. The system of claim 10, wherein the reinforced learning neural network models a customer profile of electricity use.

18. The system of claim 10, wherein the supply/demand forecasting model is constructed from open source modeling packages.

* * * * *